W. S. CLARKE.
Mixing-Spoons.

No. 133,564.

Patented Dec. 3, 1872.

Witnesses:
C. Sedgwick
A. Lincott

Inventor:
Wm. S. Clarke
per Munn & Co.
Attorneys.

UNITED STATES PATENT OFFICE.

WILLIAM S. CLARKE, OF ISHPEMING, MICHIGAN.

IMPROVEMENT IN MIXING-SPOONS.

Specification forming part of Letters Patent No. 133,564, dated December 3, 1872.

*To all whom it may concern:*

Figure 1:
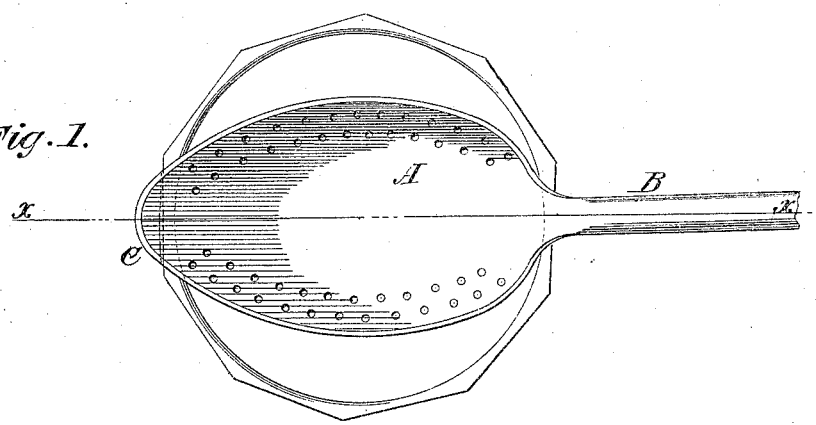
Figure 2:
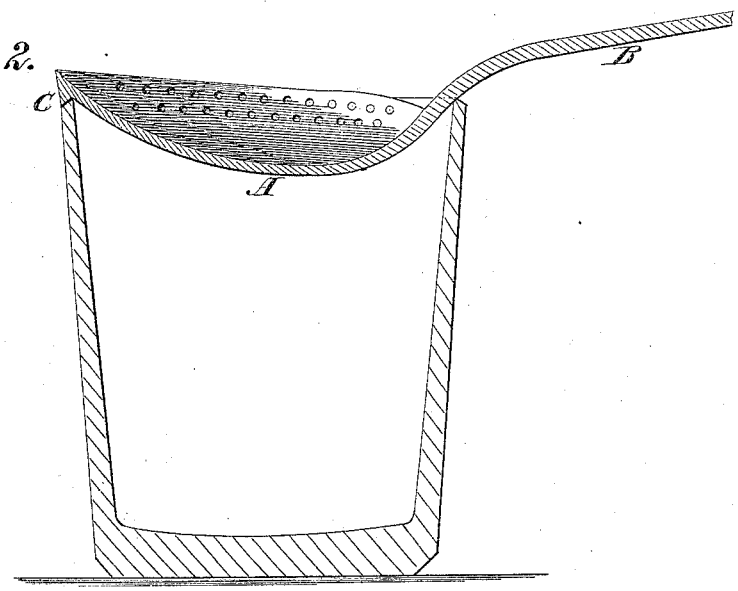

Be it known that I, WILLIAM S. CLARKE, of Ishpeming, in the county of Marquette and State of Michigan, have invented a new and useful Improvement in Mixing-Spoon, of which the following is a specification:

Figure 1 is a top view of my improved mixing-spoon, illustrating its use. Fig. 2 is a detail section of the same taken through the line $x\ x$, Fig. 1.

Similar letters of reference indicate corresponding parts.

My invention has for its object to furnish an improved spoon for preparing medicines, mixing drinks, and for other purposes, which shall be simple in construction and convenient in use; and it consists in the spoon made with a projection upon the lower side of its point, and either with or without perforations in the side parts of its bowl, as hereinafter more fully described.

A represents the bowl of my improved spoon, which is made in the general form of the bowl of an ordinary spoon, and which is provided with a handle, B, of any convenient form and size. Upon the under side of the point of the bowl A is formed a projection, nib, or shoulder, C, to catch upon the edge of the tumbler or other vessel in which the mixing is to be done, as illustrated in Figs. 1 and 2, so that the said spoon may be held securely in place upon the upper edge of the tumbler or other vessel. The side parts of the bowl A may be perforated with numerous small holes, as shown in Figs. 1 and 2.

In using the spoon it is placed upon the edge of the tumbler or other vessel, the sugar or other substance is placed in it, and the water or other liquid allowed to run upon it; or the medicines or other liquids to be mixed are dropped or poured into it one or more at a time, as may be desired.

Having thus described my invention, I claim as new and desire to secure by Letters Patent—

A spoon, A B, having a projection or shoulder, C, formed upon the under side of its point, and either with or without perforations in the side parts of its bowl, substantially as herein shown and described, and for the purpose set forth.

WILLIAM S. CLARKE.

Witnesses:
   W. P. HEALY,
   J. TRURAN.